United States Patent [19]

Geffs, John J.

[11] Patent Number: 4,898,512
[45] Date of Patent: Feb. 6, 1990

[54] APPARATUS AND METHOD FOR REDUCING EFFECTS OF DRAFT TUBE PRESSURE FLUCTUATIONS

[76] Inventor: Geffs, John J., 8841 Britland Way, Fair Oaks, Calif. 95628

[21] Appl. No.: 328,578

[22] Filed: Mar. 27, 1989

[51] Int. Cl.$^4$ ............................ F03B 11/04; F03B 3/10
[52] U.S. Cl. ............................ 415/1; 415/117; 415/119; 415/910
[58] Field of Search ............ 415/910, 1, 49, 116, 415/117, 110, 108, 113, 119, 914

[56] References Cited

U.S. PATENT DOCUMENTS

| | | | |
|---|---|---|---|
| 2,507,796 | 5/1950 | Martin | 415/119 X |
| 3,044,744 | 7/1962 | Berlyn | 415/110 |
| 3,238,534 | 3/1966 | Hartland | 415/910 X |
| 3,372,645 | 3/1968 | Willi | 415/1 |
| 3,658,436 | 4/1972 | Oishi et al. | 415/1 |
| 3,923,417 | 12/1975 | Swiecicki | 415/110 |
| 3,945,754 | 3/1976 | Hagiga et al. | 415/1 |
| 4,014,624 | 3/1977 | Takase et al. | 415/1 |
| 4,504,188 | 3/1985 | Traver et al. | 415/914 X |
| 4,537,558 | 8/1985 | Tsunoda et al. | 415/1 |

FOREIGN PATENT DOCUMENTS

| | | | |
|---|---|---|---|
| 63536 | 5/1977 | Japan | 415/117 |
| 74736 | 6/1977 | Japan | 415/1 |
| 41661 | 4/1978 | Japan | 415/1 |
| 93974 | 7/1980 | Japan | 415/1 |
| 117364 | 7/1983 | Japan | 415/116 |
| 1498 | of 1915 | United Kingdom | 415/117 |

Primary Examiner—Everett A. Powell, Jr.
Attorney, Agent, or Firm—Mark C. Jacobs

[57] ABSTRACT

Apparatus and method for reducing the effects of draft tube pressure fluctuations acting on a runner in a hydraulic reaction turbine or the effects of suction tube pre-rotation acting on the impeller in a centrifugal pump. A closed surge suppression chamber is mounted about the exterior of the turbine draft tube or pump suction tube. A plurality of openings are provided about the exterior of the draft tube or pump suction tube communicating with both the interior of the draft tube or pump suction tube and the interior of the chamber near its bottom thereof. An air inlet is provided leading into the chamber at the top thereof. In operation, and during operation of the turbine or pump where a rotating helical vortex of water has formed in the draft tube or pump suction tube, water flows from the draft tube or pump suction tube through the openings and into the bottom of the chamber while air is injected into the top of the chamber. This forms an air bubble in the chamber and forces air through the openings into contact with the lower pressure center of the vortex as it rotates in the draft tube or pump suction tube abating the same. This chamber also provides an air cushion to attenuate pressure surges which may be provided as the helical vortex rotates through the elbow in a hydraulic reaction turbine draft tube or pump suction tube, and it also provides an air cushion when the water vapor bubbles in the core of the vortex collapse.

12 Claims, 2 Drawing Sheets

APPARATUS AND METHOD FOR REDUCING EFFECTS OF DRAFT TUBE PRESSURE FLUCTUATIONS

BACKGROUND OF THE INVENTION

1. Field Of The Invention

The invention relates to hydraulic reaction turbines and centrifugal pumps; and, more particularly, to apparatus and method for reducing the effects of draft tube pressure fluctuations acting on a runner in a hydraulic reaction turbine or the effects of suction tube pre-rotation acting on the impeller in a centrifugal pump.

2. Description Of The Prior Art

Hydraulic reaction turbines have been known in the art for many years. In the early development of such turbines, it was discovered that turbines which were operated at heads and flows other than the design point of the turbine, experienced rough operation and power swings resulting from water passing out through the draft tube of the turbine in a whirling and spiralling vortex. This is particularly true of Francis-type turbines, propeller turbines and pump turbines. In Apr. 1940, W. J. Rheingans published a paper in the Transactions of the American Society of Mechanical Engineers in which he outlined the results of an extensive study of the draft tube surging phenomenon in turbines. In his paper, and in the comments from others, several schemes for suppressing draft tube surging were discussed; these included fins projecting from the draft tube walls, an extended runner cone filling the space occupied by the draft tube vortex, venting of the turbine head cover and air injection into the draft tube through the straightening fins and through a hole in the draft tube wall. Since that time there have been numerous papers on the subject and many suggested schemes to reduce draft tube surging. Such schemes have included air admission to the turbine runner, to the draft tube, to the lower side of the runner through the runner cone, or through holes in streamlined shapes placed across the draft tube. Air has also been injected into the penstock, into the space between the wicket gates and the runner, and through the runner band. There have also been many schemes for the use of fins in the draft tube; these include flow splitters and a coaxial hollow cylinder placed below the center of the runner cone and supported by fins which can be rotated, and several types of fins as discussed hereinabove.

When a hydraulic reaction turbine is operated at a head and/or flow which is different from the design point, the water will follow a helical path as it passes out through the draft tube. If the operating conditions are sufficiently remote from the design point, a vortex will form in the swirling water just below the runner cone and this vortex usually will follow a helical path as it passes out through the draft tube. The core of the vortex is usually filled with water vapor. The spiralling vortex causes pressure fluctuations which vary the net head experienced by the runner and cause the generated power to fluctuate in a similar manner. Net head is also affected when the water vapor bubbles in the core of the vortex collapse.

A similar problem exists in centrifugal pumps. Centrifugal pumps are designed to operate with a given quantity of flow and against a given head. When a centrifugal pump is operated at its design point, the water flowing through the machine is laminar, irrotational flow, and the pump runs smoothly. Centrifugal pumps have been in use for many years. Early in their development, it was known that prerotation occurred in the suction tube if a pump was operated at a head and/or quantity of flow different from the design values. This phenomenon has been noticed especially in large pumps with Francis-type impellers. It has also been suspected in some large Deriaz-type machines. If the operating conditions are sufficiently remote from the design point, a vortex will form in the center of the water flowing in through the suction tube and usually will follow a helical path. This vortex flow causes a rotating low pressure area under the pump impeller which can induce destructive vibration of the pump, pump shaft, motor shaft and the motor.

There is thus a need for reducing the effects of draft tube pressure fluctuations acting on a runner in a hydraulic reaction turbine or the effects of suction tube pre-rotation acting on the impeller in a centrifugal pump.

SUMMARY OF THE INVENTION

It is an object of this invention to provide improved apparatus and method for reducing the effects of draft tube pressure fluctuations acting on a runner in a hydraulic reaction turbine or the effects of suction tube pre-rotation acting on the impeller in a centrifugal pump.

It is a further object of this invention to carry out the foregoing object by providing an annular chamber surrounding the draft tube with air and/or water from the chamber injected into the rotating low pressure area of the vortex in the draft tube of a hydraulic reaction turbine or the suction tube of a centrifugal pump.

It is still further an object of this invention to carry out the foregoing objects by providing a plenum of air to cushion the pressure fluctuations as much as possible before they get to the turbine runner of the turbine or pump impeller of the pump and affect the operation of the same.

These and other objects are preferably accomplished by providing a closed surge suppression chamber about the exterior of the turbine draft tube or pump suction tube. A plurality of openings are provided about the exterior of the tube communication with both the interior of the tube and the bottom of the chamber. An air inlet is provided leading into the chamber at the top thereof. In operation, and during operation of the turbine or pump where a rotating helical vortex of water has formed in the draft tube or pump suction tube, water flows from the draft tube or pump suction tube through the openings and into the bottom of the chamber while air is injected into the chamber. This forms an air bubble in the chamber and forces air through the openings into contact with the lower pressure center of the vortex as it rotates in the draft tube or pump suction tube abating the same.

A pressure fluctuation causes the water level in the surge suppression chamber to rise and fall, or fall and rise, as the air cushion compresses and expands to cushion the fluctuation in the turbine draft tube pressure or pump suction tube pressure.

DESCRIPTION OF THE PREFERRED EMBODIMENTS

Figure 1:
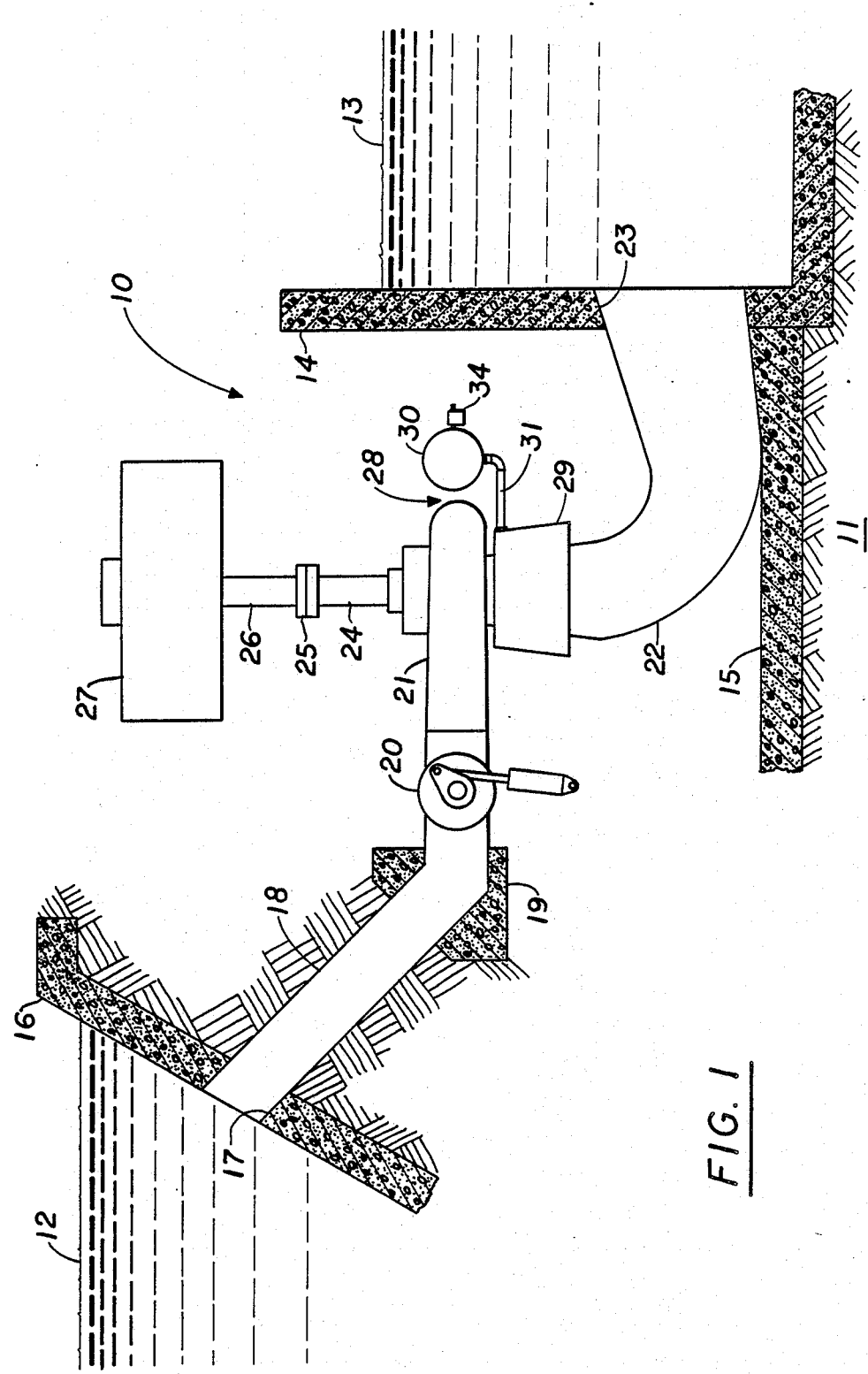
FIG. 1 is an elevational view, partly schematic and partly sectional, of a hydraulic reaction turbine system in accordance with the teachings of the invention.

Referring now to FIG. 1, a hydraulic turbine system 10 is shown having a base foundation 11, an elevated source of water 12 and a lower tail water reservoir 13. Foundation 11 includes a generally vertical back wall 14 setting off the tail water in reservoir 13 with a floor 15 on base foundation 11 extending from wall 14.

An intake structure 16 is provided on the foundation at the upper or elevated water source 12. An opening 17 is provided in structure 16 fluidly communicating with a downwardly slanted penstock 18 extending through structure 16. Penstock 18 leads through, and is supported in, an anchor block 19 and from said block 19 through the shut-off valve 20 of the turbine in system 10.

From valve 20, penstock 18 extends to the hydraulic reaction turbine 21 of system 10 fluidly communicating with a draft tube 22 which in turn communicates with the tail water reservoir 13 through an opening 23 in wall 14.

A turbine shaft 24 communicates with the runner (not visible in FIG. 1) in the interior of turbine 21, as is well known in the turbine art, and shaft 24 is coupled via coupling 25 to a generator shaft 26. Shaft 26 is in turn coupled to the rotor (not visible in FIG. 1) of generator 27 for driving the same.

The foregoing describes conventional parts of a typical hydraulic reaction turbine system in a hydroelectric generating station and, as such, forms no part of the invention other than in the environment of draft tube pressure fluctuations acting on the runner of the turbine 21 as will now be described. Thus, the turbine runner of the turbine 21 drives the turbine shaft 24 which in turn drives the generator shaft 26 through coupling 25. The shaft 26 drives the rotor of generator 27, which may be a synchronous generator, thereby generating electricity.

Thus, as particularly contemplated in the present invention, draft tube pressure fluctuations reducing means 28 are provided for reducing the effect of draft tube pressure fluctuations acting on the runner of turbine 21. (See FIG. 2)

Figure 2:
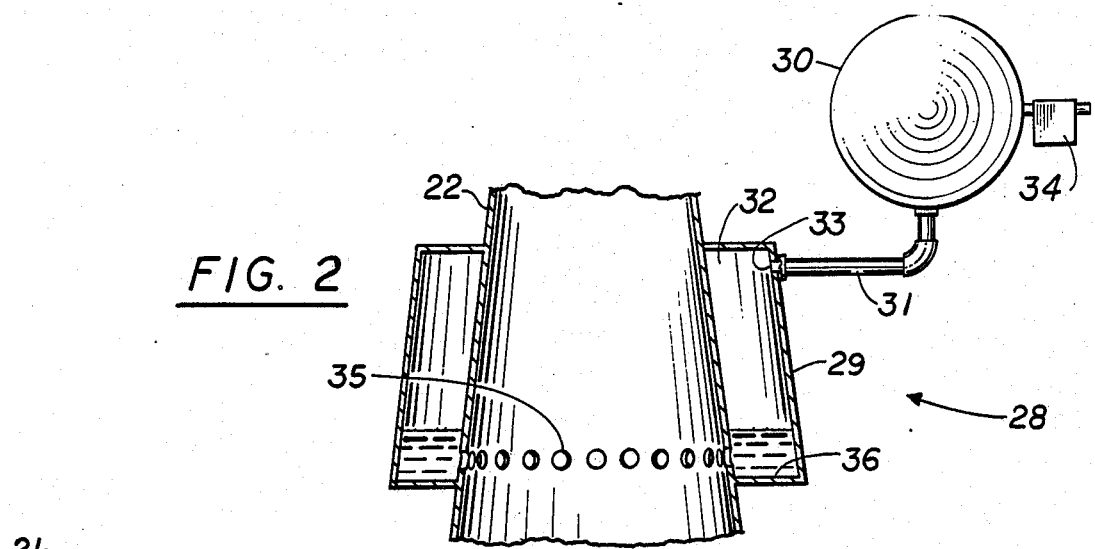
FIG. 2 is a section through the draft tube and suppression chamber.

As particularly seen in FIG. 2, such means 28 includes a surge suppression chamber 29 surrounding draft tube 22 adjacent turbine 21. Chamber 29 is toroidially-shaped and welded or otherwise secured to the outer peripheral surface of draft tube 22. An air tank or air reservoir 30, or other source of air, is provided having a pipe or conduit 31 leading to the outer wall of chamber 29 and communicating with the interior 32 of chamber 29 via opening 33. A conventional air pressure regulator 34 coupled to tank 30 is provided for regulating the pressurized air therein. As seen in FIG. 2, a plurality of spaced openings or holes 35 extend about the outer periphery of draft tube 22 adjacent the floor or lower wall 36 of chamber 29. These holes 35 extend through the wall of draft tube 22 and serve to fluidly communicate the interior of draft tube 22 with the interior of chamber 29.

Figure 3:
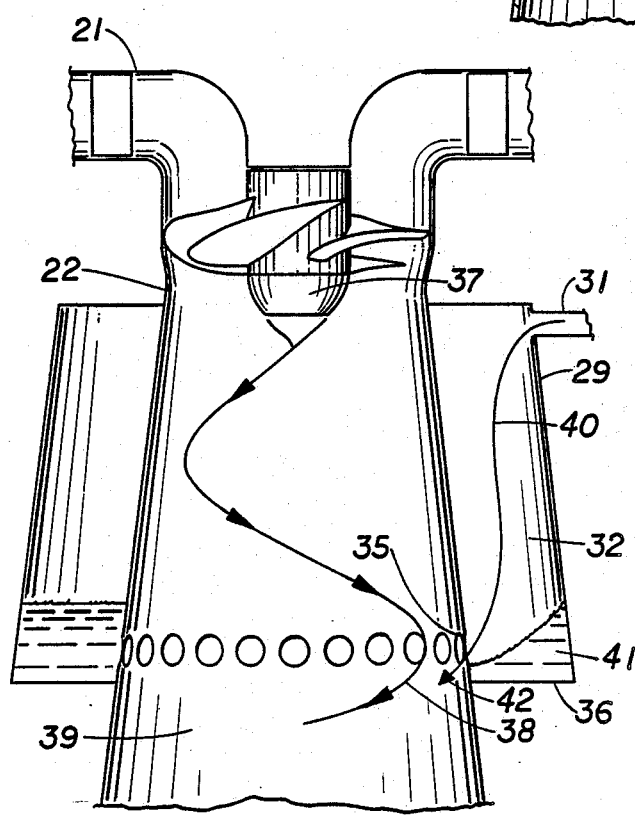
FIG. 3 is a schematic illustration of the helical effect taking place in the draft tube of the apparatus of FIGS. 1 and 2.

As seen schematically in FIG. 3, during operation of system 10, a vortex can form below the tip of the nose cone 37 of the runner of the hydraulic reaction turbine 21. The center of the vortex is a low pressure area which is usually below the vapor pressure of water at that temperature. The vortex can follow a helical path in the interior 39 of draft tube 22. Air from tank 30, regulated by regulator 34, is introduced into the interior 32 of chamber 29 where it flows through holes 35 into the interior 39 of draft tube 22 as indicated by arrow 40. This air meets vortex 38 and abates the same. Simultaneously, water 41, trapped at the bottom of chamber 29, flows with the air through holes 35 back into the interior 39 of draft tube 22, as indicated by arrow 42 which is in essence a continuation of 40.

The chamber 29 acts as a surge suppression chamber and said means 28 performs two functions. First, it injects air or water into the lower pressure center of the draft tube vortex 38 as vortex 38 rotates in its peculiar spiral or helical path inside of draft tube 22. Second, it provides an air cushion to dampen pressure pulsations travelling up through draft tube 22 to the hydraulic reaction turbine 21.

Although only a single series of holes 35 have been provided about the outer periphery of draft tube 22, obviously more than one such row of holes or openings may be provided, such plurality of rows may be of any desired configurations.

Figure 4:
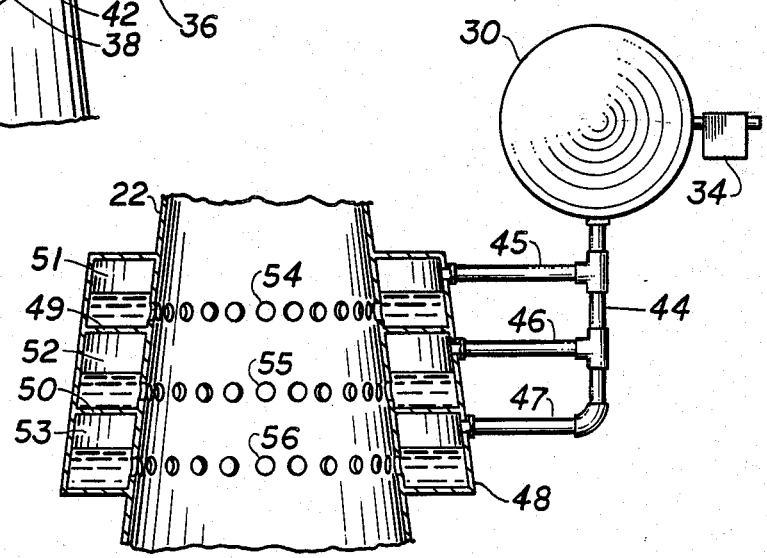
FIG. 4 is a view similar to FIG. 2 showing a modification thereof.

Further, as seen in FIG. 4 wherein like numerals refer to like parts of the apparatus of FIGS. 1 and 2, pipe 31 may be replaced by a manifold 44 having a plurality of inlet pipes, such as pipes 45 to 47, communicating with the interior of chamber 48 which is divided into a plurality of interior compartments 51 to 53 via annular partitions 49, 50. Each compartment 51 to 53 fluidly communicates with the interior of draft tube 22 through spaced holes (rows 54, 55 and 56, respectively), which holes open into each respective compartment adjacent the bottom thereof, as shown. The operation of the compartments and holes is identical to that discussed hereinabove with respect to the embodiment of FIGS. 1 and 2.

Water can flow through draft tube 22 in either vertical direction depending on the operation. Thus, with regard to FIGS. 1, 2 and 4, a hydraulic turbine has been discussed. In a centrifugal pump, water will flow in the opposite direction up through the suction tube. In this case, the surge suppression chamber 29 or means 48 again performs two functions. The first function is to inject air or water into the lower pressure center of the suction tube vortex as it rotates in its spiral path inside of the suction tube 22. The second function is to provide an air cushion to dampen pressure pulsations travelling up through the tube 22 (now a suction tube) to the pump (instead of the turbine).

It can be seen that there is disclosed apparatus and method to suppress pressure pulsations in vertical hydraulic turbine draft tubes and pump suction tubes.

Any suitable materials and dimensions may be used. For example, chamber 29 may be about 20% to 90% of the vertical height of draft tube 22. The outer diameter of chamber 29 alone may be about twice the outer cross-sectional diameter of tube 22. For example, the outer cross-sectional diameter of tube 22 may be about 4 feet with an overall height of 20 feet.

In that case, the outer diameter of chamber 29 may be about 7 feet with an overall height of about 6 feet. The holes may then be about 2 inches to 4 and ½ inches in diameter and spaced about ½ inch apart.

The regulator 34 is used to control the pressure of air injected into each chamber 29 or 48. Preferably, the air pressure therein is maintained a few psi above the draft tube pressure at its point of connection to the surge suppression chamber. This will feed air into the vortex spiral as it rotates within the tube and reduce the pressure disturbance.

The tail water elevation at reservoir 13 determines the pressure at the point of connection 35 of tube 22 to the surge suppression chamber 29. If the tail water elevation is low enough, the pressure will be below atmospheric pressure and the surge suppression chamber needs only to be left open to the atmosphere to aspirate air through a pipe of sufficient size. If tail water is high, the chamber pressure is preferably set a few psi above the draft tube pressure at the interconnecting point to the turbine. The lowest chamber pressure which will suppress the effects of the draft tube surge is generally the most desirable. This pressure will rarely be more than 10 psi above draft tube pressure.

If the tail water is high enough that air must be injected, it is most economical to limit air injection through the surge suppression chamber to those operating regimes where it is really needed to stabilize operation. The control device can be anything from a valve which is opened and closed as the unit servomotor passes certain locations in its stroke, to a computerized control system which would use sensors to measure the disturbance in the generator output which was being caused by the draft tube surge and regulating the volume and pressure of the air being sent to the surge suppression chamber.

Although the foregoing discusses a turbine, similar effects take place in a pumping operation. However, most problems of this nature as discussed herein occur in a turbine or generating operation.

The size and number of air entry points or holes depends on the diameter of the draft tube at the interconnecting point to the turbine draft tube, the rotating speed of the machine, the magnitude of the draft tube surge which is expected and the size of the surge suppression chamber. The Rheingans formula for frequency of draft tube surges is still considered as good means for estimating surge frequency. It is $$\text{frequency} = \frac{\text{Rotation speed}}{3.6}.$$

For the surge suppression chamber to attenuate the pressure pulsations caused by draft tube surging, the total area of the ring of holes must be sufficiently large to accommodate water flow into the surge chamber and out again within the time allowed by the draft tube surge frequency. For example a 200 RPM machine could experience a draft tube surge at frequency=200 RPM/3.6=55.6 cycles/minute.

Air can be injected in any desired quantity, such as between about 0.05 to 2% of the unit flow. With peripheral air injection as disclosed herein, the volume of air at standard temperature and pressure injected may be as low as 0.05% of the unit flow. The least quantity of air injection required to suppress the draft tube surges is desirable and the operator can observe the conventional wattmeter on the unit control board to determine such (or even by audible discernment, as such surges are quite noisy). By placing the holes as close as possible to the bottom of the surge suppression chambers, the largest possible air bubble is created which cushions pressure pulsations in the draft tube. The air bubble or bubbles act as a cushion or shock absorber and abate the pressure wave before it reaches the turbine runner. Preferably, air is injected into the holes continually when the apparatus is running. Air pressure pulsations come up the draft tube and reaches the holes, the water carried thereby sloshes through the holes into the surge suppression chamber and the air cushion dampens the pressure pulsations.

It can be seen that there is disclosed a simple and inexpensive process for abating the vortex created in a hydraulic reaction turbine or centrifugal pump. Although there is disclosed a preferred embodiment of the invention, variations thereof may occur to an artisan and the scope of the invention is to be limited only by the scope of the claims.

I claim:

1. Apparatus for reducing the effects of pressure fluctuations acting within a tube wherein a vortex has formed naturally during fluid flow through the tube comprising:
   a closed surge suppression chamber having a bottom wall and a top wall mounted about the exterior of the tube having an opening leading into the upper end thereof adjacent the top wall;
   a plurality of spaced apertures formed about the exterior of said tube fluidly communicating the interior of said tube with the interior of the surge suppression chamber adjacent to the bottom wall of said chamber; and
   air injection means communicating with said opening for selectively injecting air therein from any angle.

2. In the apparatus of claim 1 wherein said tube is a draft tube in a hydraulic reaction turbine having a runner therein, said tube being located adjacent said runner.

3. In the apparatus of claim 1 wherein said tube is a suction tube and located adjacent an impeller in a centrifugal pump.

4. In the apparatus of claim 1 wherein a plurality of said chambers are provided, each of said chambers surrounding said tube and having common walls interconnecting said chambers, each of said chambers having air injection means communicating with its respective opening and said tube having a plurality of spaced rows of said apertures fluidly communicating the interior of said tube with the bottom wall of each of said chambers.

5. In the apparatus of claim 1 wherein said air injection means includes regulating means for regulating the injection of air.

6. In the apparatus of claim 1 wherein said chamber is about twice the outer diameter of said tube and between about 20% to 90% of the overall height of said tube.

7. In the apparatus of claim 1 wherein the outer diameter of said tube is about 4 feet, the overall height of said tube is about 20 feet, the outer diameter of said chamber is about 6 feet.

8. In the apparatus of claim 7 wherein said apertures are each about 2 inches to ½ inches in diameter and spaced about ½ inches apart.

9. A method for reducing the effects of pressure fluctuations within a tube in a turbine or pump system wherein a spiraling vortex of fluid is formed during fluid flow through the tube comprising the steps of:

forming a closed surge suppression chamber about the exterior of said tube;

fluidly communicating the interior of said tube with the bottom interior of said chamber; and injecting air into the top of said chamber thereby forming an air bubble in said chamber above a water reservoir formed in said chamber at the bottom thereof thereby abating said vortex.

10. In the method of claim 9 wherein the step of injecting air includes the step of injecting air at a pressure a few psi above the pressure within said tube adjacent its connection to the turbine or pump of the system.

11. In the method of claim 9 wherein the step of injecting air includes the step of injecting air in a quantity of between about 0.05% to 2% of the unit flow of fluid through said tube.

12. In the method of claim 9 wherein a pressure fluctuation in the hydraulic turbine draft tube or pump suction tube will cause the water level to rise and fall, or fall and rise, in the surge suppression chamber as the air in the chamber compresses and expands to cushion the pressure fluctuation.

* * * * *